United States Patent [19]
Shouda

[11] Patent Number: 5,179,696
[45] Date of Patent: Jan. 12, 1993

[54] GENERATOR DETECTING INTERNAL AND EXTERNAL READY SIGNALS FOR GENERATING A BUS CYCLE END SIGNAL FOR MICROPROCESSOR DEBUGGING OPERATION

[75] Inventor: Masahiro Shouda, Tokyo, Japan

[73] Assignee: NEC Corporation, Tokyo, Japan

[21] Appl. No.: 718,912

[22] Filed: Jun. 24, 1991

Related U.S. Application Data

[63] Continuation of Ser. No. 223,857, Jul. 25, 1988, abandoned.

[30] Foreign Application Priority Data

Jul. 24, 1987 [JP] Japan .................. 62-185918

[51] Int. Cl.⁵ .................................................. G06F 13/00
[52] U.S. Cl. ................................. 395/575; 364/271; 364/264.1; 364/264.6; 364/260.2; 364/DIG. 1
[58] Field of Search ............... 395/725, 575; 371/19, 371/21.1, 25.1, 27

[56] References Cited

U.S. PATENT DOCUMENTS

| | | | |
|---|---|---|---|
| 3,937,938 | 2/1976 | Mathews | 364/200 |
| 4,090,238 | 5/1978 | Russo | 364/200 |
| 4,179,737 | 12/1979 | Kim | 364/200 |
| 4,200,916 | 4/1980 | Seipp | 364/900 |
| 4,216,374 | 8/1980 | Lam et al. | 371/27 |
| 4,231,087 | 10/1980 | Hunsberger | 364/200 |
| 4,303,990 | 12/1981 | Seipp | 364/900 |
| 4,308,581 | 12/1981 | Raghunathan | 364/200 |
| 4,308,615 | 12/1981 | Koegel | 364/900 |
| 4,370,709 | 1/1983 | Fosdick | 364/200 |
| 4,429,368 | 1/1984 | Kurii | 364/200 |
| 4,449,183 | 5/1984 | Flahive et al. | 364/200 |
| 4,482,953 | 11/1984 | Burke | 364/200 |
| 4,600,988 | 7/1989 | Tendulkar | 364/131 |
| 4,663,730 | 5/1987 | Ikeda | 364/140 |
| 4,674,089 | 6/1987 | Poret et al. | 364/200 |
| 4,720,811 | 1/1988 | Yamaguchi | 364/900 |
| 4,755,997 | 7/1988 | Takahashi | 371/19 |
| 4,785,416 | 11/1988 | Stringer | 364/200 |
| 4,789,924 | 12/1988 | Fukuta | 364/200 |
| 4,811,345 | 3/1989 | Johnson | 371/16.1 |

FOREIGN PATENT DOCUMENTS 2112972 12/1981 United Kingdom .

*Primary Examiner*—Lawrence E. Anderson
*Assistant Examiner*—Eric Coleman
*Attorney, Agent, or Firm*—Foley & Lardner

[57] ABSTRACT

In a debugging microprocessor having a function of elongating a bus cycle in response to an external ready signal and used in a microprocessor development support system having a function capable of tracing and analyzing the result of execution, there is provided a generator for generating a bus cycle end signal for the microprocessor development support system. The generator comprises a ready detection circuit receiving an external ready signal, a clock signal and an enable signal which is rendered active only when the debugging microprocessor is in a condition capable of accepting data. The ready detection circuit operates to detect the status of the external ready signal at a time defined by a clock appearing when the enable signal is active, so as to generate an internal ready signal if the external ready signal is active. A control circuit is connected to receive the internal ready signal for generating a signal indicative of an end of the bus cycle for a predetermined period of time starting from a next clock state. This bus cycle end signal is outputted to an external device or stage of the debugging microprocessor.

8 Claims, 5 Drawing Sheets

GENERATOR DETECTING INTERNAL AND EXTERNAL READY SIGNALS FOR GENERATING A BUS CYCLE END SIGNAL FOR MICROPROCESSOR DEBUGGING OPERATION

This application is a continuation of application Ser. No. 07/223,857, filed Jul. 25, 1988, now abandoned.

BACKGROUND OF THE INVENTION

1. Field of the invention

The present invention relates to a debugging microprocessor used in a microprocessor development support system, and more specifically to a debugging microprocessor having a generator for generating a bus cycle end signal for a microprocessor development support system having a function capable of tracing and analyzing the result of execution.

2. Description of related art

Hitherto, two types of debugging microprocessors have been known. A first type of debugging microprocessor is such that the sampling timing of a ready signal is different from the sampling timing of data, and therefore, data is sampled at a clock state next to a clock state in which the ready signal is rendered effective. Further, this type of debugging microprocessor is constructed to generate a bus cycle signal BCY indicative of a bus cycle and a data strobe signal DS for input/output of data. Therefore, the bus cycle signal BCY or the data strobe signal DS is added, as the content to be traced, to an address, data and the like, and then, the bus cycle signal BCY or the data strobe signal DS being traced is checked so that effective address and data contained in the content being traced are clarified, with the result that it is possible to analyze an executed instruction on the basis of the trace result. Accordingly, a microprocessor development support system in combination with this type of debugging microprocessor will involve no problem in the analysis of the trace result.

A second type of debugging microprocessor is such that the sampling timing of a ready signal is the same as the sampling timing of data, and therefore, data is sampled at the same time as the ready signal is judged to be effective. The latest high performance microprocessors are of this type, and therefore, recent debugging microprocessors are also of this type.

The second type of debugging microprocessor is constructed to output a bus cycle start signal BST indicative of the start of the bus cycle, but does not generate a signal corresponding to the bus cycle signal BCY or the data strobe signal DS of the first type of debugging microprocessor. Namely, since there is no signal corresponding to the bus cycle signal BCY or the data strobe signal DS, effective input data is not certain. Therefore, the microprocessor development support system using this type of debugging microprocessor has been required to trace the ready signal READY for the purpose of detecting effective input data.

As mentioned above, since the second type of debugging processor is adapted to generate the bus cycle start signal, it is possible to detect the time when an address is effective, by tracing the bus cycle start signal. On the other hand, in order to detect the time when the input data is effective, it is necessary to trace the ready signal. Furthermore, there is no way other than to conclude that the data appearing when the ready signal being traced is in an active condition is effective. However, even if the ready signal being traced is in an active condition, it may happen that the debugging microprocessor itself does not judge that the ready signal at this time is active. Namely, sufficient reliability cannot be obtained in detecting correct effective input data on the basis of the trace data.

SUMMARY OF THE INVENTION

Accordingly, it is an object of the present invention to provide a debugging microprocessor which is used in a microprocessor development support system and which has overcome the above mentioned defect of the conventional one.

Another object of the present invention is to provide a debugging microprocessor for use in a microprocessor development support system having a function capable of tracing and analyzing the result of execution, which debugging microprocessor can give a sufficient reliability to the analysis of the trace result.

The above and other objects of the present invention are achieved in accordance with the present invention by a debugging microprocessor having a function of elongating a bus cycle in response to an external ready signal and used in a microprocessor development support system having a function capable of tracing and analyzing the result of execution. The debugging microprocessor includes a generator for generating a bus cycle end signal for the microprocessor development support system. The generator comprises a ready detection circuit receiving an external ready signal, a clock signal and an enable signal which is rendered active only when the debugging microprocessor is in a condition capable of accepting data. The ready detection circuit operates to detect the status of the external ready signal at a time defined by a clock appearing when the enable signal is active, so as to generate an internal ready signal if the external ready signal is active. This internal ready signal is inputted to a control circuit for generating a signal indicative of an end of the bus cycle for a predetermined period of time starting from a next clock state. The bus cycle end signal is outputted to an external device or stage of the debugging microprocessor.

In one embodiment, the control circuit includes a D-type flipflop having a clock input connected to receive the clock and a D-input connected to receive the internal ready signal so as to generate the bus cycle end signal at its Q output.

In another embodiment, the control circuit includes a state decoder connected to receive the clock and the internal ready signal and operating to generate at least a first state signal $ST_1$, a second state signal $ST_2$, a wait state signal $ST_W$ and an idle state signal $ST_I$, and a NOR gate receiving the first state signals $ST_1$ and the idle state signal $ST_I$ for generating the bus cycle end signal at its Q output.

The above and other objects, features and advantages of the present invention will be apparent from the following description of preferred embodiments of the invention with reference to the accompanying drawings.

DESCRIPTION OF THE PREFERRED EMBODIMENTS

Figure 1:
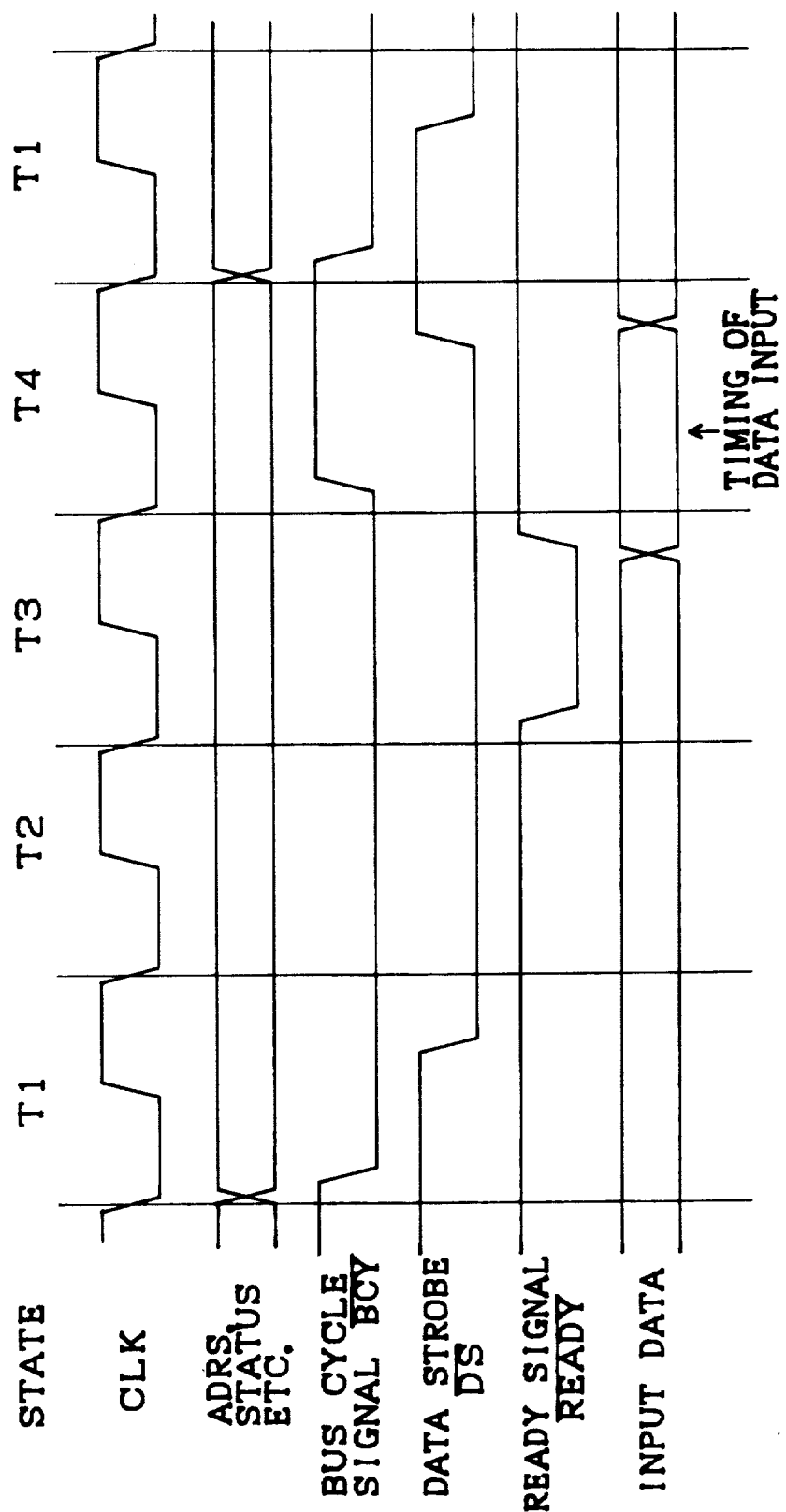
FIG. 1 is a timing chart illustrating a bus cycle executed in the first type of conventional debugging microprocessor.
Figure 2:
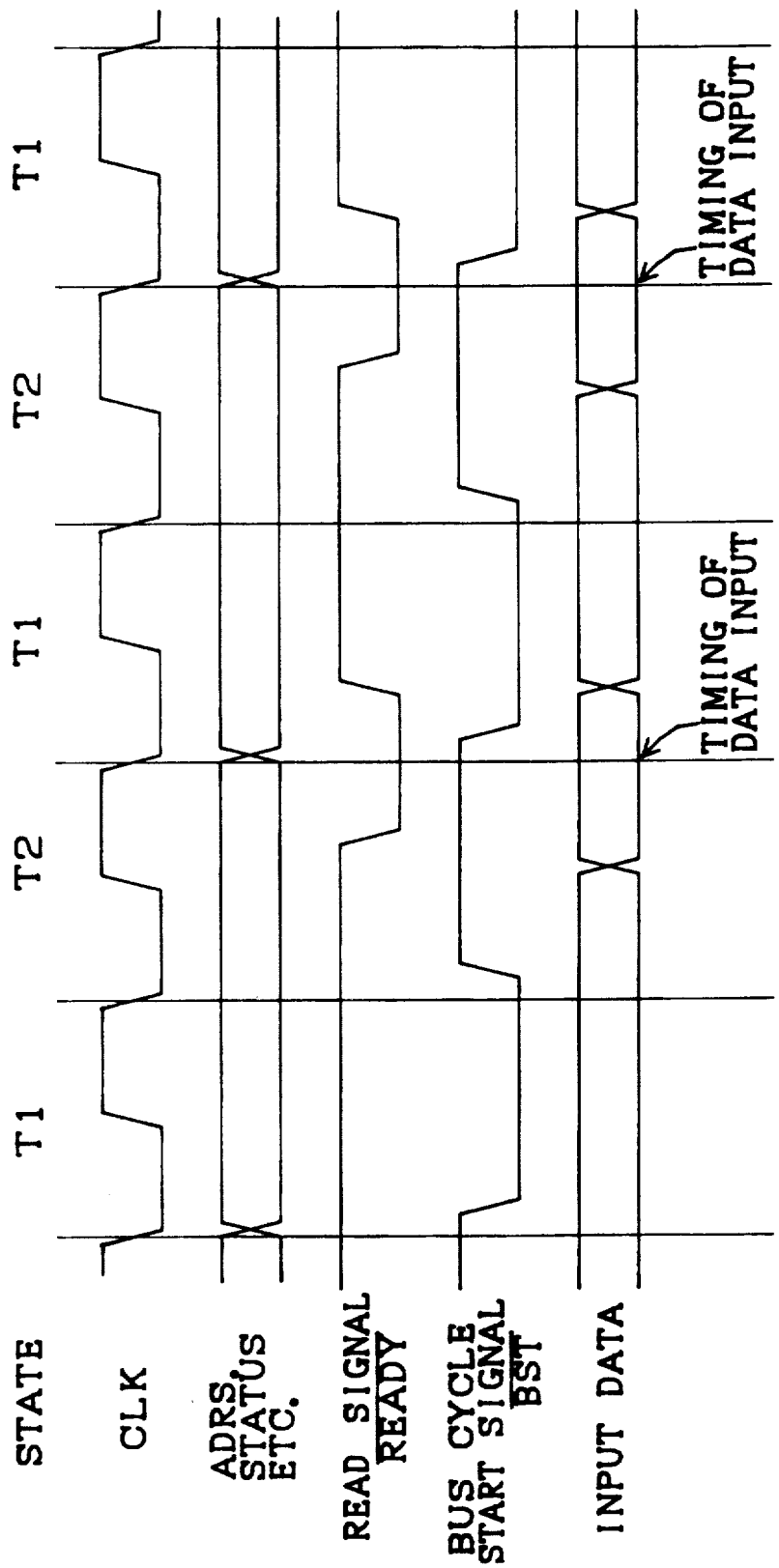
FIG. 2 is a chart similar to FIG. 1 but illustrating a bus cycle executed in the second type of conventional debugging microprocessor.

Before explaining an embodiment of the debugging microprocessor in accordance with the present invention, reference should be made to FIGS. 1 and 2 which illustrate a timing chart of a bus cycle executed in the first and second types of conventional debugging microprocessors as mentioned above, respectively. In these figures, overhead or overlying lines indicate a negative logic.

From comparison between FIGS. 1 and 2, it should be understood that in the second type of debugging microprocessor there is no signal corresponding to a bus cycle signal BCY or a data strobe signal DS, as shown in FIG. 2, and therefore, the microprocessor development support system using the second type of debugging microprocessor has been required to trace the ready signal READY for the purpose of detecting an effective input data. Furthermore, there is no way other than to conclude that the data at a time when the ready signal being traced is in an active condition is effective. However, even if the ready signal being traced is in an active condition, it may happen that the debugging microprocessor itself does not judge that the ready signal at this timing is active. Namely, a sufficient reliability cannot be obtained in detecting a correct effective input data on the basis of the trace data.

The present invention has been made to overcome this problem in the second type of debugging processor.

Figure 3:
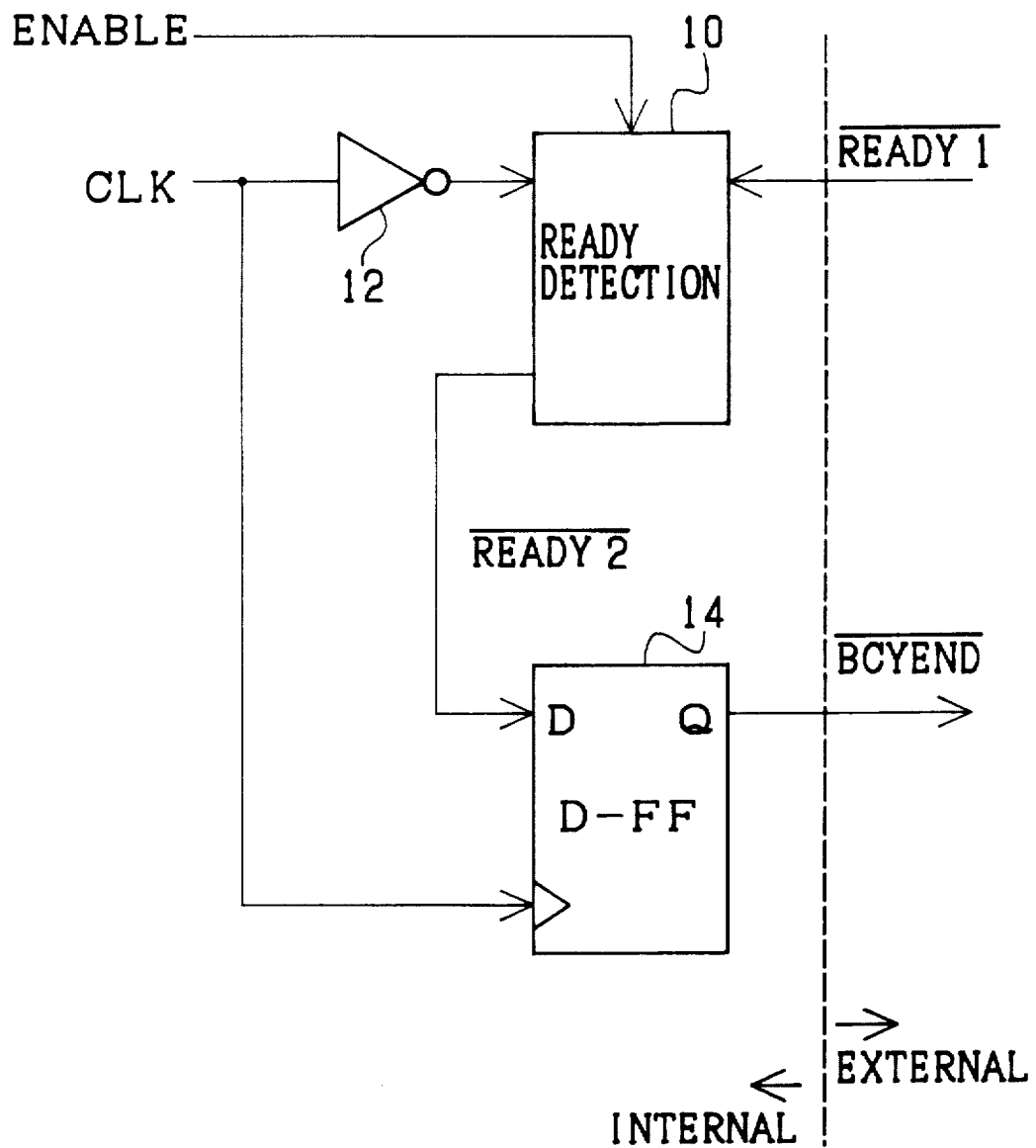
FIG. 3 is a block diagram of a generator for generating a bus cycle end signal, which is constructed in accordance with the present invention and is used in a debugging microprocessor for a microprocessor development support system having a function capable of tracing and analyzing the result of execution.

Referring to FIG. 3, there is shown a diagram of a debugging microprocessor in accordance with the present invention. The shown debugging microprocessor includes a ready detection circuit 10 connected to receive a clock CLK through an inverter 12 and an external ready signal READY1 from an external device or stage. This ready detection circuit 10 is also connected to receive an enable signal ENABLE which is rendered active only when the debugging microprocessor is in a condition capable of accepting data. When the enable signal ENABLE is active, the ready detection circuit 10 operates to check the status of the external ready signal READY1 at each falling edge of the clock CLK, and to generate an internal ready signal READY2 if the the external ready signal READY1 is active. This internal ready signal READY2 is inputted to a D input of a D-type flipflop 14, which is in turn connected to receive the clock CLK at its clock input. This flipflop 14 checks the status of the internal ready signal READY2 at a rising edge of each clock CLK, and outputs an active bus cycle end signal BCYEND from its Q output if the the internal ready signal READY2 is active.

Incidentally, as would be seen from the above, a dotted line shown in FIG. 3 indicates an imaginary boundary between the internal portion and the portion external to the microprocessor. Namely, the left side of the dotted line indicates the internal portion of the microprocessor, and the right side of the dotted line indicates the portion external to the microprocessor. In addition, the other circuits of the debugging microprocessor and the other signals (such as address, data, and status signals) for the debugging microprocessor are omitted for simplification of the drawings and the explanation.

The above mentioned debugging processor operates with bus cycles each fundamentally composed of two clocks. Therefore, If the enable signal ENABLE is active, the ready detection circuit 10 samples the external ready signal READY1 at an end of one machine cycle, namely at a falling edge of a clock for a second state (T2) of one machine cycle, or at an end of a dummy cycle such a wait cycle and an idle cycle (at a falling edge of a clock for the dummy cycle). If the external ready signal READY1 is then active, the debugging processor fetches the data at that time and goes into a next bus cycle. On the other hand, if the external ready signal READY1 is inactive, a wait state TW is interposed after the T2 state. Thereafter, if the external ready signal READY1 is active at an end of the wait state, namely at the falling edge of a clock which constitutes the wait state, data at that time is fetched, and the microprocessor will go into an idle state TI which is a next bus cycle. This idle state TI means that a bus cycle has not been started, and it is assumed that a BST signal indicates a start of a bus cycle.

Figure 4:
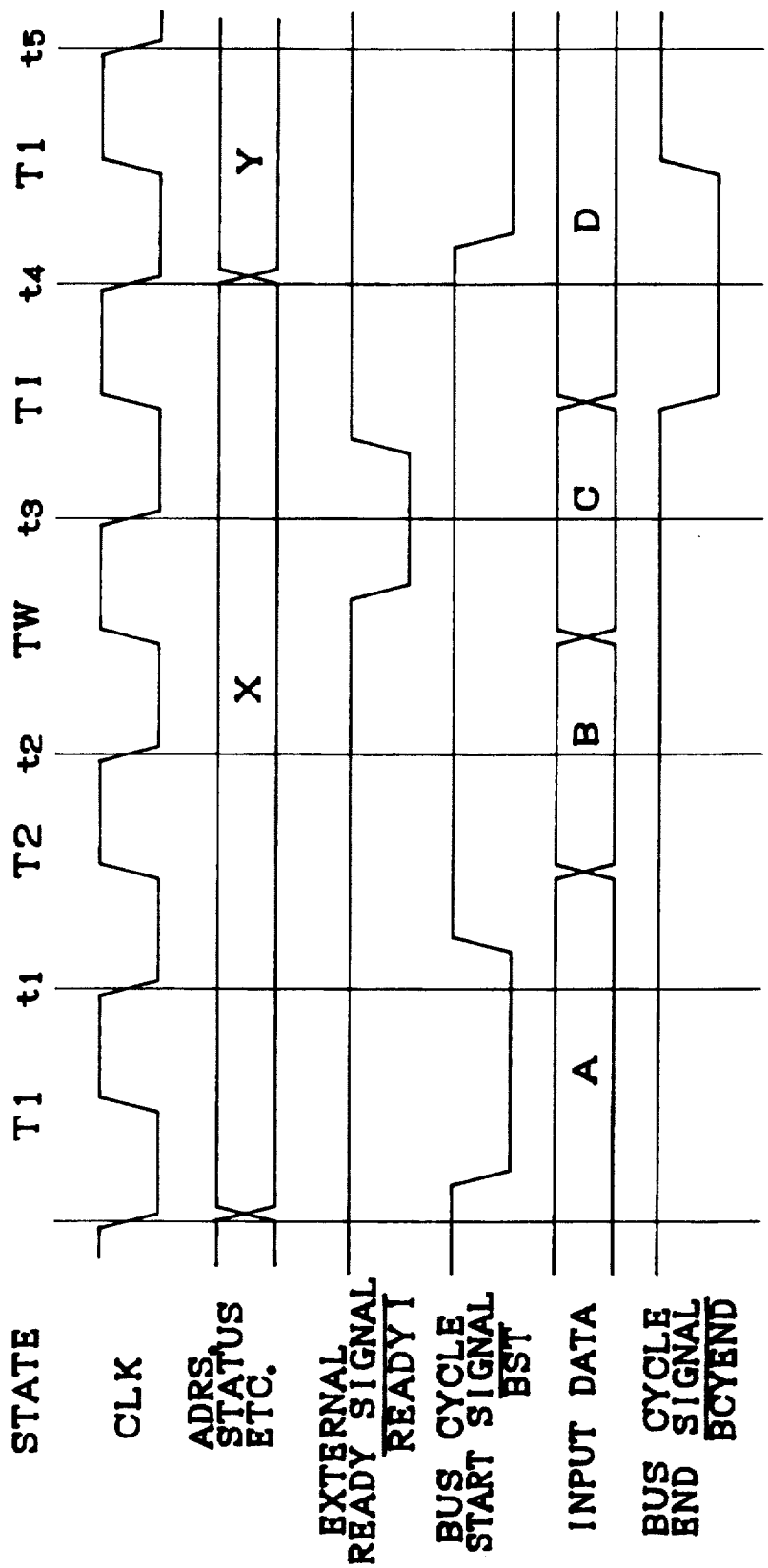
FIG. 4 is a timing chart illustrating a bus cycle executed in the one embodiment of the debugging microprocessor shown in FIG. 3.

Now, the operation will be explained with reference to FIG. 4 which illustrates a timing chart of the operation. In this figure, overhead or overlying lines indicate a negative logic. Here, assume that each cycle is constituted of a T1 state and a T2 state, and the enable signal ENABLE is rendered active at a rising edge of a clock for the T2 state and inactive at a rising edge of a clock for a succeeding T1 state or at a rising edge of a clock for an idle state succeeding the T2 state.

Thus, the enable signal ENABLE is rendered active at a rising edge of a clock for the T2 state, and therefore, the ready detection circuit 10 samples the external ready signal READY1 at an end of the T2 state, namely at a timing t2. Assuming that the external ready signal READY1 is inactive at the timing t2 as shown in FIG. 4, the ready detection circuit 10 will maintain the internal ready signal READY2 inactive, and then, as mentioned above, a wait state TW is interposed after the T2 state. Thereafter, the ready detection circuit 10 samples the external ready signal READY1 at an end of the wait state TW, namely at a timing t3. Assuming that the external ready signal READY1 is active at the timing t3 as shown in FIG. 4, the ready detection circuit 10 will render the internal ready signal READY2 active This active internal ready signal READY2 is maintained from the timing t3 to a rising edge of a clock for a next idle state, since the enable signal ENABLE will be rendered inactive at a rising edge of a clock for a succeeding T1 state or at a rising edge of a clock for an idle state succeeding to the T2 state.

The active internal ready signal READY2 is applied to the D input of the flipflop 14, and therefore, is sampled to the flipflop 14 in response to a rising edge of a clock just after the internal ready signal READY2 has been rendered active. As a result, the bus cycle end signal BCYEND outputted from the flipflop 14 is made active from a rising edge of a clock for the idle state TI to a rising edge of a clock for a state next to the idle state TI. Therefore, in this example, the T1 and T2 states are followed by the wait state TW, which is succeeded by the idle state TI, which then goes into a next T1 state.

The following TABLE 1 indicates the result of trace in a debugging microprocessor having no bus cycle end signal $\overline{BCYEND}$, and the TABLE 2 shows the timing in the embodiment of the debugging microprocessor in accordance with the present invention.

TABLE 1

| TIMING | ADDRESS | $\overline{BST}$ | DATA |
|---|---|---|---|
| t1 | X | 0 | A |
| t2 | X | 1 | B |
| t3 | X | 1 | C |
| t4 | X | 1 | D |
| t5 | Y | 0 | D |

TABLE 2

| TIMING | ADDRESS | $\overline{BST}$ | DATA | $\overline{BCYEND}$ |
|---|---|---|---|---|
| t1 | X | 0 | A | 1 |
| t2 | X | 1 | B | 1 |
| t3 | X | 1 | C | 1 |
| t4 | X | 1 | D | 0 |
| t5 | Y | 0 | D | 1 |

In the conventional debugging microprocessor, it can be seen from TABLE 1 that an address is effective when the $\overline{BST}$ signal is 0, but is not sure which of the data A, B, C and D is fetched by the debugging microprocessor. Even if the external ready signal $\overline{READY1}$ is directly traced, since there is no guarantee that the active condition (and the inactive condition) of the external ready signal as the result of the trace is perfectly consistent with the external ready signal $\overline{READY1}$ which is detected by the debugging microprocessor, there is a possibility that an error occurs in the result of analysis of the traced result.

But, as shown in TABLE 2, it can be clearly known by tracing the bus cycle end signal $\overline{BCYEND}$ outputted from the debugging microprocessor in accordance with the present invention, that the time t3 before the sample time at which the bus cycle end signal $\overline{BCYEND}$ becomes active has traced effective data.

Figure 5:
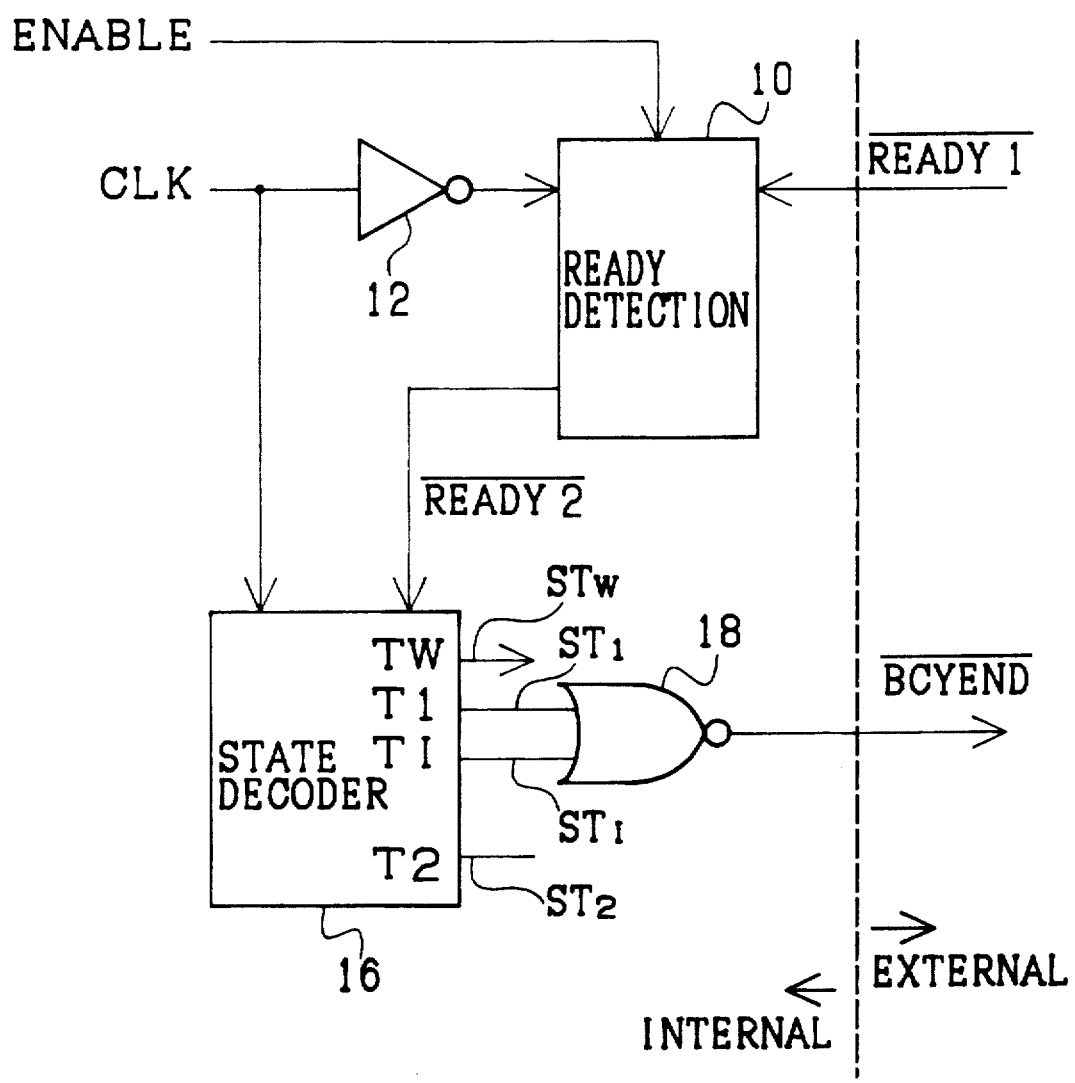
FIG. 5 is a diagram similar to FIG. 3 but showing a second embodiment of the bus cycle end signal generator constructed in accordance with the present invention.

Turning to FIG. 5, there is shown a second embodiment of the debugging microprocessor in accordance with the present invention. In FIG. 3, elements and signals similar to those of first embodiment shown in FIG. 3 are given the same reference numerals, and therefore, explanation thereof will be omitted.

As seen from comparison between FIGS. 3 and 5, the second embodiment includes, in place of the flipflop 14, a state decoder 16 which is connected to receive the clock CLK and the internal ready signal $\overline{READY2}$ and is adapted to generate state signals $ST_1$, $ST_2$, $ST_W$ and $ST_I$ indicative of the states T1, T2 TW and TI, respectively. The state signals $ST_1$ and $ST_I$ are inputted to a NOR gate 18 which generates the bus cycle end signal $\overline{BCYEND}$. Each of the state signals $ST_1$, $ST_2$, $ST_W$ and $ST_I$ is active when it is at a high level. Therefore, the bus cycle end signal $\overline{BCYEND}$ is maintained active when the bus cycle is either in the T1 state or in the TI state. Accordingly, in this embodiment, the analysis of the trace result assumes that the data just before the bus cycle end signal $\overline{BCYEND}$ has changed from the inactive condition to the active condition is a correct data.

As has been described above, the debugging microprocessor in accordance with the present invention generates the internal ready signal in response to the external ready signal and is triggered by the internal ready signal to generate the bus cycle end signal to the external of the debugging microprocessor. Therefore, if this bus cycle end signal is added to the content to be traced by the microprocessor development support system, it is possible to give sufficient reliability to the analysis of the trace result, particularly the discrimination of correct data.

The invention has thus been shown and described with reference to the specific embodiments. However, it should be noted that the present invention is in no way limited to the details of the illustrated structures but changes and modifications may be made within the scope of the appended claims.

I claim:

1. In a debugging microprocessor, in a microprocessor development support system, for elongating a bus cycle in response to an external ready signal from an external device which is accessed by a data access request from said debugging microprocessor, said external ready signal indicating that said external device has prepared data to be supplied to said debugging microprocessor, said debugging microprocessor tracing and analyzing the result of execution of instructions by said debugging microprocessor, a generator comprising:

a ready detection circuit receiving said external ready signal from said external device, and a clock signal and an enable signal from said debugging microprocessor, said enable signal being rendered active only when said debugging microprocessor is in a ready condition for accepting data, said ready detection circuit detecting the status of said external ready signal at a timing defined by each clock signal appearing when said enable signal is active, so as to generate an internal ready signal if said external ready signal is active, said debugging microprocessor responding to said internal ready signal to receive data and a control circuit responding to said internal ready signal for generating a bus cycle end signal indicating that data has been received by said debugging microprocessor, for a predetermined period of time starting from a next clock state, said bus cycle end signal being outputted to said microprocessor development support system after said microprocessor detects that said external ready signal is active and therefore said data has been fetched, so that said bus cycle end signal is used to indicate that said data has been fetched by said microprocessor just before generation of said bus cycle end signal.

2. A generator claimed in claim 1 wherein said control circuit includes a D-type flipflop having a clock input connected to receive said clock signal and a D-input connected to receive said internal ready signal so as to generate said bus cycle end signal at its Q output.

3. A generator claimed in claim 1 wherein said control circuit includes a state decoder connected to receive said clock signal from said microprocessor and said internal ready signal from said ready detection circuit and operating to generate at least a first state signal STI, a second state signal ST2, a wait state signal STW and an idle state signal ST1, and a NOR gate receiving said first state signal ST1 and said idle state signal STI for generating said bus cycle end signal at its Q output.

4. A generator claimed in claim 1 wherein said ready detection circuit detects the status of said external ready signal at a falling edge of said clock signal appearing when said enable signal is active.

5. A microprocessor for executing a bus cycle in response to an external ready signal from an external device which is accessed by a data access request from said microprocessor, said external ready signal indicating that said external device has prepared data to be supplied to said microprocessor, comprising:

a ready detection circuit receiving said external ready signal from said external device, and a clock signal and an enable signal generated in said microprocessor, said enable signal being rendered active only when said microprocessor is in a ready condition for accepting data, said ready detection circuit detecting the status of said external ready signal at a timing defined by each said clock signal appearing when said enable signal is active, so as to generate an internal ready signal if said external ready signal is active, said microprocessor responding to said internal ready signal to receive data from said external device; and a control circuit responding to said internal ready signal for generating a bus cycle end signal indicating that data has been received by said microprocessor, for a predetermined period of time starting from a next clock state, said bus cycle end signal being outputted to said external device after said microprocessor detects that said external ready signal is active and therefore said data has been fetched, so that said bus cycle end signal is used to indicate that said data has been fetched by said microprocessor just before generation of said bus cycle end signal.

6. A microprocessor claimed in Claim 5 wherein said control circuit includes a D-type flip-flop having a clock input connected to receive said clock signal and a D-input connected to receive said internal ready signal so as to generate said bus cycle end signal at its Q output.

7. A microprocessor claimed in Claim 5 wherein said control circuit includes a state decoder connected to receive said clock signal from said microprocessor and said internal ready signal from said ready detection circuit and operating to generate at least a first state signal ST1, a second state signal ST2, a wait state signal STW and an idle state signal STI and a NOR gate receiving said first state signal ST1 and said idle state signal STI for generating said bus cycle end signal at its Q output.

8. A microprocessor claimed in Claim 5 wherein said ready detection circuit detects the status of said external ready signal at a falling edge of said clock signal appearing when said enable signal is active.

* * * * *